United States Patent
Tsukamoto

(10) Patent No.: US 7,239,231 B2
(45) Date of Patent: Jul. 3, 2007

(54) LIGHT CONTROL DEVICE FOR VEHICLE

(75) Inventor: Takeshi Tsukamoto, Okazaki (JP)

(73) Assignee: Denso Corporation, Kariya (JP)

( * ) Notice: Subject to any disclaimer, the term of this patent is extended or adjusted under 35 U.S.C. 154(b) by 196 days.

(21) Appl. No.: 11/012,382

(22) Filed: Dec. 16, 2004

(65) Prior Publication Data

US 2005/0157509 A1   Jul. 21, 2005

(30) Foreign Application Priority Data

Jan. 19, 2004   (JP)   ............. 2004-010959

(51) Int. Cl.
*B60Q 1/00* (2006.01)

(52) U.S. Cl. .......... 340/438; 340/439; 340/468; 340/469; 340/309.16; 340/600; 340/602; 362/464; 362/466; 362/276; 315/77; 315/82; 315/83

(58) Field of Classification Search .......... 340/438, 340/439, 468, 469, 309.16, 600, 602; 362/464, 362/466, 276; 315/77, 82, 83
See application file for complete search history.

(56) References Cited

U.S. PATENT DOCUMENTS

| | | | | |
|---|---|---|---|---|
| 4,117,453 A | * | 9/1978 | Hodgson et al. | 315/82 |
| 4,139,801 A | * | 2/1979 | Linares | 315/83 |
| 4,357,558 A | * | 11/1982 | Massoni et al. | 315/83 |
| 4,613,791 A | | 9/1986 | Kurihara et al. | |
| 6,396,040 B1 | | 5/2002 | Hill | |
| 7,049,950 B2 | * | 5/2006 | Schmitt et al. | 340/468 |
| 2003/0138132 A1 | * | 7/2003 | Stam et al. | 382/104 |

FOREIGN PATENT DOCUMENTS

| | | |
|---|---|---|
| DE | 43 24 164 A1 | 1/1994 |
| JP | A-S60-203542 | 10/1985 |
| JP | A-H04-368238 | 12/1992 |
| JP | A-10-315844 | 12/1998 |

* cited by examiner

*Primary Examiner*—Tai Nguyen
(74) *Attorney, Agent, or Firm*—Posz Law Group, PLC

(57) ABSTRACT

In a light control device for a vehicle, a control portion determines whether an illuminance detected by an illuminance sensor reaches a first reference illuminance, and performs a turning on or off control of lights of the vehicle based on the determined result. When the control portion receives an external environment change signal from an environment change detecting means, the control portion uses a second reference illuminance higher than the first reference illuminance, instead of the first reference illuminance, and performs the turning on or off control when the illuminance detected by the illuminance sensor reaches the second reference illuminance. Accordingly, vehicle lights can be suitably turned on or off in accordance with an external environment of the vehicle.

16 Claims, 3 Drawing Sheets

LIGHT CONTROL DEVICE FOR VEHICLE

CROSS REFERENCE TO RELATED APPLICATION

This application is based on Japanese Patent Application No. 2004-10959 filed on Jan. 19, 2004, the contents of which are incorporated herein by reference.

FIELD OF THE INVENTION

The present invention relates to a light control device for a vehicle, which automatically performs turning on or off control of vehicle lights based on illuminance at an upper side of the vehicle.

BACKGROUND OF THE INVENTION

A conventional vehicle light control device described in JP-A-10-315844 includes an upper side illuminance sensor for detecting an external illuminance at an upper side of the vehicle, and a control portion for controlling turning on or off operation of vehicle lights. The control portion determines whether or not the illuminance detected by the upper side illuminance sensor reaches a predetermined reference illuminance, and controls the turning on or off operation based on this determination.

Furthermore, this vehicle light control device includes a vehicle speed sensor for detecting a vehicle speed, and a light condition setting means. As the vehicle speed increases, the light condition setting means increases the reference illuminance, and decreases a delay time. Here, the delay time is a time from a determination time where it is determined whether or not the detected illuminance reaches the reference illuminance up to an illumination time of the vehicle lights.

Accordingly, when the vehicle runs at a high speed, the reference illuminance is high and the delay time is short. Therefore, when the vehicle runs under an elevated bridge at a high speed, the lights may be momentarily turned on and off, and a passenger in a leading vehicle or an oncoming vehicle may mistakenly feel this turning on or off operation as a passing.

Furthermore, lights provided around an entrance and an exit of a tunnel are generally brighter compared with lights provided inside the tunnel in order to reduce a drastic change in lighting between the inside and the outside of the tunnel on an expressway. Thus, the headlights of the vehicle may be not instantly turned on based on the vehicle speed even when the vehicle enters the tunnel. As described above, in this vehicle light control device, because the reference illuminance and the delay time are controlled by the vehicle speed, it is difficult to suitably control the vehicle lights in accordance with the exterior environment of the vehicle, due to the control being based on the vehicle speed.

SUMMARY OF THE INVENTION

In view of the above-described problems, it is an object of the present invention to provide a vehicle light control device that suitably controls lighting operation in accordance with an exterior environment of the vehicle.

According to an aspect of the present invention, a vehicle light control device includes an upper side illuminance sensor for detecting an illuminance at an upper side of the vehicle, a control portion that determines whether the illuminance detected by the upper side illuminance sensor reaches a first reference illuminance set beforehand and that performs a turning on or off control of lights of the vehicle based on a determined result, and an environment change detecting means for detecting a predetermined external environment change of the vehicle. The environment change detecting means is connected to the control portion to send an external environment change signal to the control portion when the environment change detecting means detects the predetermined external environment change. In the vehicle light control device, when the control portion receives the external environment change signal from the environment change detecting means, the control portion uses a second reference illuminance higher than the first reference illuminance, instead of the first reference illuminance, and performs the turning on or off control by comparing the illuminance detected by the upper side illuminance sensor with the second reference illuminance. Accordingly, the vehicle lights can be suitably controlled in accordance with the external environment of the vehicle.

For example, the environment condition detecting means includes a tunnel detecting means for detecting a tunnel. In this case, when the control portion receives a tunnel detection signal from the tunnel detecting means, the control portion performs the turning on or off control by comparing the illuminance detected by the upper side illuminance sensor with a tunnel reference illuminance used as the second reference illuminance. In contrast, when the tunnel detection signal from the tunnel detecting means is not received, the control portion compares the illuminance detected by the upper side illuminance sensor with the first reference illuminance, and performs the light turning on or off operation. Therefore, when the vehicle enters a tunnel, the lights can be quickly turned on regardless of a vehicle speed. The tunnel detecting means can detect a tunnel using the illuminance detected by a front side illuminance sensor for detecting an illuminance of a vehicle front side or based on fluctuation of the illuminance detected by the upper side illuminance sensor.

Furthermore, the environment condition detecting means can include a precipitation detecting means for detecting a precipitation. In this case, when the control portion receives a precipitation detection signal from the precipitation detecting means, the control portion performs the turning on or off control by comparing the illuminance detected by the upper side illuminance sensor with a precipitation reference illuminance used as the second reference illuminance. Accordingly, the vehicle lights can be suitably controlled in accordance with the presence or absence of precipitation or a precipitation amount. For example, the precipitation detecting means may be a precipitation sensor for detecting a precipitation, such as a rain sensor for detecting rain drops. Alternatively, the precipitation detecting means may detect the precipitation based on drive operation of a wiper drive device of the vehicle.

In this vehicle light control device, when the control portion receives a tunnel detection signal from the tunnel detecting means while receiving the precipitation detection signal from the precipitation detecting means, the control portion performs the turning on or off control by comparing the illuminance detected by the upper side illuminance sensor with the tunnel reference illuminance used as the second reference illuminance, regardless of the precipitation detection signal. In contrast, when the control portion receives the precipitation detection signal from the precipitation detecting means without receiving the tunnel detection signal, the control portion performs the turning on or off control by comparing the illuminance detected by the upper side illuminance sensor with the rain reference illuminance.

According to another aspect of the present invention, the control portion performs the turning on or off control of the lights at a time delayed by a predetermined time after the control portion determines that the illuminance detected by the upper side illuminance sensor reaches the first reference illuminance. In contrast, when the control portion receives an external environment change signal such as a tunnel detection signal from the environment change detecting means, the control portion performs the turning on or off control of the lights at a time delayed by a delay time shorter than the predetermined time after the determination. Accordingly, when the vehicle enters a tunnel, the lights can be quickly illuminated. Even in this case, the control portion can use the second reference illuminance higher than the first reference illuminance, instead of the first reference illuminance, and performs the light turning on or off control operation at a time delayed by the delay time after determining whether the illuminance detected by the upper side illuminance sensor reaches the second reference illuminance. In this case, the vehicle lights can be more quickly illuminated when the vehicle enters a tunnel.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

Figure 1:
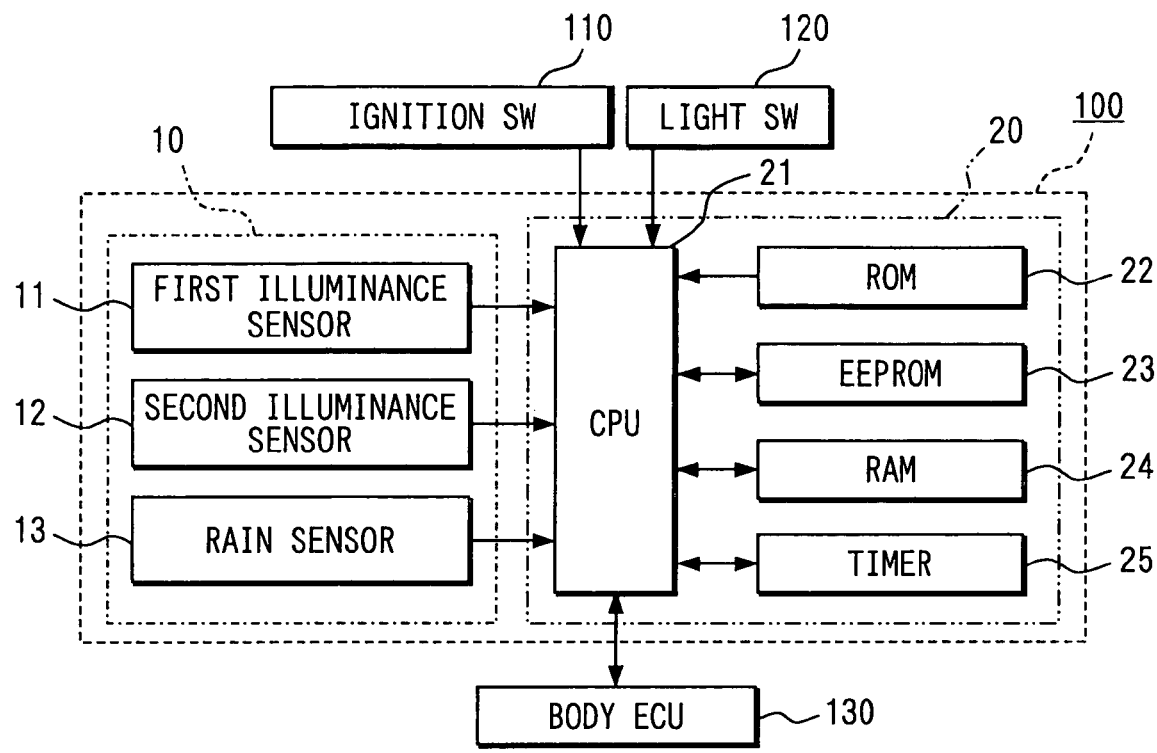
FIG. 1 is a block diagram showing a control system of a vehicle light control device according to a preferred embodiment of the present invention.

A preferred embodiment of the present invention will be now described with reference to FIGS. 1–5. As shown in FIG. 1, a light control device 100 for a vehicle includes a sensor portion 10 for detecting variations in the external environment of the vehicle, and a light ECU 20 for controlling turning on and off operation of vehicle lights (e.g., head lights and tail lamps) based on signals from the sensor portion 10.

The sensor portion 10 is constructed with a first illuminance sensor 11 (i.e., upper side illuminance sensor), a second illuminance sensor 12 (i.e., front side illuminance sensor) and a precipitation sensor such as a rain sensor 13. The first illuminance sensor 11 detects an illuminance at a vehicle upper side in a sensor detection range SA shown in FIG. 2, and outputs the detection signal to a central processing unit (CPU) 21 of the light ECU 20. The CPU 21 performs a comparison determination between the illuminance detected by the first illuminance sensor 11 and a light threshold that is set in advance, and controls the turning on or off operation based on the determination result.

Figure 2:
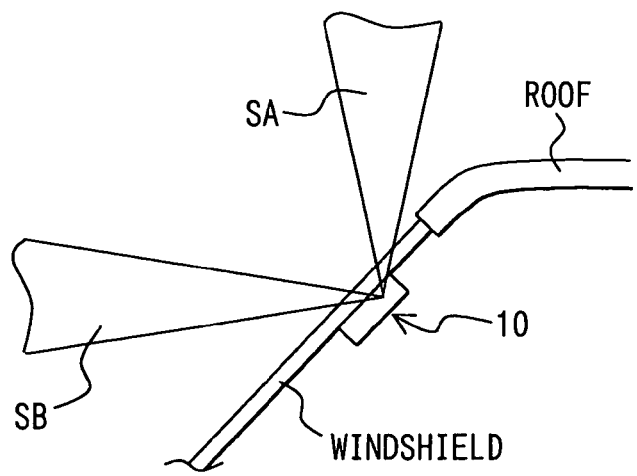
FIG. 2 is schematic diagram showing a light sensing range SA of a first illuminance sensor and a light sensing range SB of a second illuminance sensor according to the preferred embodiment.

The second illuminance sensor 12 detects an illuminance at a vehicle front side in a sensor detection range SB shown in FIG. 2, and outputs the detection signal to the CPU 21 of the light ECU 20. For example, when the front side of the vehicle is positioned under an elevated bridge, the illuminance (sensor output voltage) detected by the second illuminance sensor 12 is higher as compared with a case where the front side of the vehicle is positioned in a tunnel. Accordingly, by setting a tunnel determination threshold described later at a predetermined value, the tunnel can be accurately detected based on the illuminance detected by the second illuminance sensor 12. Therefore, the second illuminance sensor 12 can be used as a tunnel detecting means for detecting the tunnel in the present invention.

In this embodiment, each of the first illuminance sensor 11 and the second illuminance sensor 12 is constructed of a photodiode. The first illuminance sensor 11, the second illuminance sensor 12 are collected together with a rain sensor 13 described latter as a single package, to form the sensor portion 10. The sensor portion 10 is fixed onto an inner surface of a front windshield of the vehicle, as shown in FIG. 2. However, the first illuminance sensor 11 and the second illuminance sensor 12 can be provided separately from the rain sensor 13, and can be attached to a dashboard together with a solar radiation sensor. In FIG. 2, SA indicates a light sensing range (sensor detection range) of the first illuminance sensor 12, and SB indicates a light sensing range (sensor detection range) of the second illuminance sensor 12.

In the example of FIG. 2, the rain sensor 13 is fixed to the inner surface of the windshield of the vehicle, as the sensor portion 10. The rain sensor 13 includes an output portion (not shown) for outputting infrared rays toward the windshield, and a receiving portion (not shown) for detecting the infrared rays reflected by the front windshield. The detection signal of the receiving portion is output to the CPU 21 of the ECU 20. For example, when rain drops adhere on a detection area of the rain sensor 13 on the windshield, a receiving amount of infrared rays received by the receiving portion is decreased. Accordingly, by setting a rain drops determination threshold (described later) to a predetermined value, a raining state (raining or non-raining) can be detected based on the receiving amount of the infrared rays. Furthermore, an amount of rainfall can be detected in accordance with a change of the receiving amount of the infrared rays. Therefore, wipers can be driven in accordance with the receiving amount of the infrared rays, that is, the amount of rainfall per unit time. Thus, a raining state can be detected by the rain sensor 13. In this embodiment, the structure of the rain sensor 13 can be changed without being limited to the above-described structure.

The light ECU 20 is constructed with a microcomputer. The microcomputer is constructed with the CPU 21, a read only memory (ROM) 22, an electrically erasable and programmable read only memory (EEPROM) 23, a random access memory (RAM) 24, a timer 25, an I/O, and a connection line for connecting those. Various control programs to be performed by the CPU 21 are stored in the ROM 22.

The EEPROM 23 stores the light threshold that is a determination reference for determining turning on or off operation based on the illuminance detected by the first illuminance sensor 11. In this embodiment, as the light threshold, the predetermined reference illuminance, a tunnel reference illuminance and a raining reference illuminance are used. The tunnel reference illuminance is set higher than the predetermined reference illuminance to be used in a tunnel detection. In contrast, the raining reference illuminance is set higher than the predetermined reference illuminance to be used in a raining state detection.

Furthermore, the EEPROM 23 stores a delay time. Generally, the turning on or off control of the vehicle lights is performed after a predetermined time (delay time) passes after the illuminance detected by the first illuminance sensor reaches the light threshold. The light threshold and/or the delay time can be set at different values for respective lights (head lights and tail lamps), and can be set at different values for the light turning on operation and the light turning off operation.

The EEPROM 23 also stores a tunnel determination threshold and a rain drops determination threshold. The tunnel determination threshold is used as a reference for determining whether or not there is a tunnel on the front side of the vehicle based on the illuminance detected by the second illuminance sensor 12. The raindrops determination threshold is used as a reference for detecting a raining state (raining or non-raining) and the amount of the rainfall.

The RAM 24 is used as an operation region in a process of the CPU 21, and the timer 25 counts the delay time.

As shown in FIG. 1, an ignition switch 110, a light switch 120 and a body ECU 130 are connected to the CPU 21. The light switch 120 is disposed in a steering wheel, for example, to introduce an ON/OFF operation of an automatic light control system based on an operation of a passenger. The body ECU 130 includes a light control relay for performing the turning on or off operation of the vehicle lights.

When the ignition switch 110 is turned on and the automatic light control system is turned on by the light switch 120, the CPU 21 outputs signals for turning on or off the vehicle lights to the body ECU 130 based on signals from the first illuminance sensor 11, the second illuminance sensor 12 and the rain sensor 13. The body ECU 130 outputs or stops a drive current for turning on the vehicle lights, based on those signals.

Next, the light control process performed by the light ECU 20 in accordance with vehicle exterior environment will be now described with reference to the flow diagram of FIG. 3.

Figure 3:
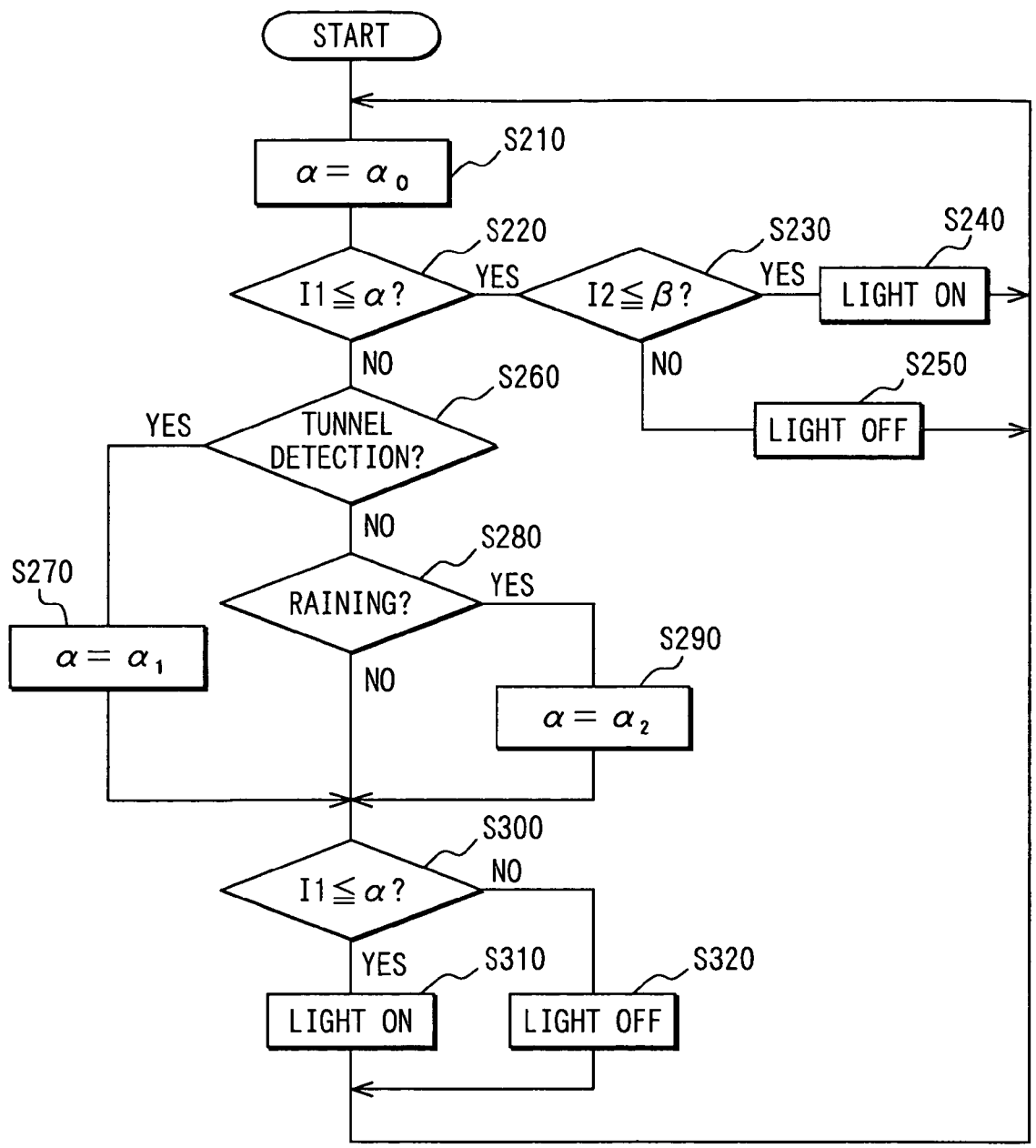
FIG. 3 is a flow diagram showing turning on and off control operation of vehicle lights according to the preferred embodiment.

In a case where the ignition switch 110 is turned on, the control program shown in FIG. 3 is started when the automatic light control system is turned on, and the control program shown in FIG. 3 is ended when the automatic light control system is turned off.

When the automatic light control system is turned on by the light switch 120 while the ignition switch 110 is turned on, the CPU 21 of the light ECU 20 sets a reference illuminance $\alpha_0$ as a light threshold $\alpha(\alpha=\alpha_0)$ at step S210. Then, at step S220, it is determined whether or not illuminance I1 detected by the first illuminance sensor 11 is equal to or lower than the light threshold $\alpha$. When the illuminance I1 detected by the first illuminance sensor 11 is equal to or lower than the light threshold $\alpha$ (i.e., the reference illuminance $\alpha_0$), the CPU 21 of the light ECU 20 determines whether or not illuminance I2 detected by the second illuminance sensor 12 is equal to or lower than a reference illuminance $\beta$ (i.e., tunnel determination threshold) at step S230. When the illuminance I2 detected by the second illuminance sensor 12 is equal to or lower than the reference illuminance $\beta$, the CPU 21 determines a dark state (e.g., night, tunnel) in which the light turning on operation is necessary for the vehicle exterior. In this case, the timer 25 counts the delay time, and the CPU 21 sends light turning on signal to the body ECU 130 at a time later from the comparison determination by the delay time. Then, at step S240, the vehicle lights are turned on.

Even when the illuminance I1 detected by the first illuminance sensor 11 is equal to or lower than the light threshold $\alpha$ (i.e., the reference illuminance $\alpha_0$), when the illuminance I2 detected by the second illuminance sensor 12 is higher than the reference illuminance $\beta$, a light turning-on unnecessary state such as in a case where the vehicle passes an elevated bridge is determined. In this case, at step S250, the vehicle lights are not turned on (turned off). Therefore, a driver or a passenger in an oncoming vehicle or a leading vehicle will not be distracted or mistakenly alerted when, for example, the vehicle passes the elevated bridge.

When the illuminance I1 detected by the first illuminance sensor 11 is larger than the light threshold $\alpha$ (i.e., the reference illuminance $\alpha_0$) at step S220, it is determined that the vehicle exterior is a light state (e.g., day time in a fine weather) where no turning on of light is necessary. However, even in this case, the vehicle lights need to be turned on in a tunnel. Thus, at step S260, the CPU 21 performs a comparison determination where the illuminance I2 detected by the second illumination sensor 12 is compared with the tunnel determination threshold (i.e., the reference illuminance $\beta$).

Figure 4:
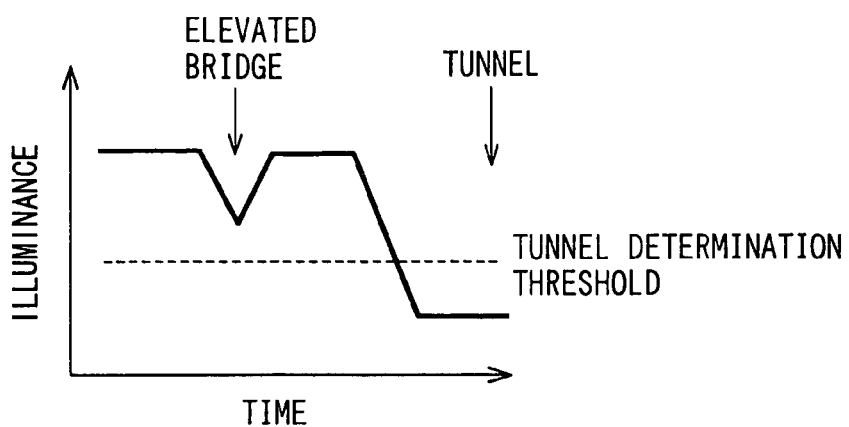
FIG. 4 is a graph for explaining a tunnel detection using the second illuminance sensor according to the preferred embodiment.

As shown in FIG. 4, the illuminance I2 detected by the second illuminance sensor 12 at the elevated bridge is different from that at the tunnel. The illuminance I2 detected by the second illuminance sensor 12 at the elevated bridge is higher than that at the tunnel. The tunnel determination threshold is set at a predetermined value for only determining the tunnel, and is stored in the EEPROM 23. As shown in FIG. 4, the tunnel determination threshold is set lower than the illuminance detected at the elevated bridge and higher than the illuminance at the tunnel detection. FIG. 4 is a graph for explaining a tunnel detection using the second illuminance sensor 12.

Accordingly, when the illuminance I2 detected by the second illuminance sensor 12 is equal to or lower than the tunnel determination threshold shown in FIG. 4, it is determined that there is a tunnel at the front side of the vehicle. In this case, the tunnel reference illuminance $\alpha_1$ that is higher than the reference illuminance $\alpha_0$ is set as the light threshold $\alpha$, instead of the reference illuminance $\alpha_0$ at step S270.

When the illuminance I2 detected by the second illuminance sensor 12 is higher than the tunnel illuminance threshold shown in FIG. 4, the CPU 21 determines there is no tunnel at the front side of the vehicle at step S260. In a raining time, even when the detected illuminance is the same as that in the fine weather, a visibility of a driver deteriorates. Accordingly, in order to sufficiently obtain the visibility of the driver, an infrared ray receiving amount detected by the rain sensor 13 is compared with a raindrops determination threshold stored in the EEPROM 23, at step S280. At step S280, when the infrared ray receiving amount detected by the rain sensor 13 is equal to or lower than the raindrops determination threshold, the raining state is determined by the CPU 21. In this case, a raining reference illuminance $\alpha_2$ that is higher than the reference illuminance $\alpha_0$ is set as the light threshold $\alpha$, instead of the reference illuminance $\alpha_0$ at step S290.

In contrast, when the infrared ray receiving amount detected by the rain sensor 13 is larger than the raindrops determination threshold, the non-raining state is determined by the CPU 21. In this case, the reference illuminance $\alpha_0$ is still set as the light threshold $\alpha$. Accordingly, the light threshold $\alpha$ corresponding to the environment of the vehicle exterior can be suitably set.

Then, the CPU 21 performs comparison determination whether or not the illuminance I1 detected by the first illuminance sensor 11 is equal to or lower than the light threshold $\alpha$ at step S300. When the illuminance I2 detected by the first illuminance sensor 11 is equal to or lower than the light threshold $\alpha$ at step S300, the timer 25 counts the delay time, and the CPU 21 sends the light turning on signal to the ECU 130 at a time delayed by a delay time from the comparison determination, at step S310. In contrast, when the illuminance I1 detected by the first illuminance sensor 11 is larger than the light threshold $\alpha$, the timer 25 counts the delay time, and the CPU 21 sends the light turning off signal to the ECU 130 at a time delayed by a delay time from the comparison determination, at step S320.

While the ignition switch 110 is turned on and the automatic light control system is turned on, the control steps S210–S320 are repeated.

Figure 5:
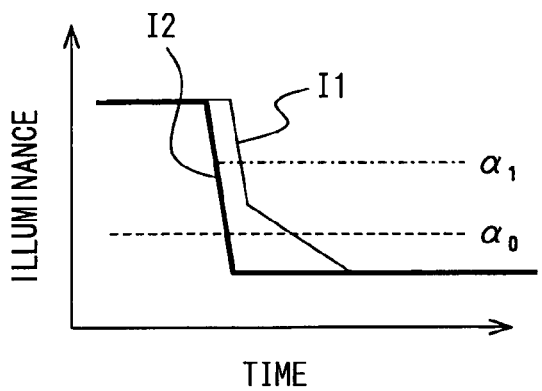
FIG. 5 is a graph for explaining the turning on or off control operation of the vehicle lights according to the preferred embodiment.

In this embodiment, the light control device 100 is provided with the second illuminance sensor 12 for detecting a tunnel in a detection direction toward the front side of the vehicle. Therefore, as shown in FIG. 5, the second illuminance sensor 12 detects the tunnel before than the first illuminance sensor 11. When there is the tunnel at the front side of the vehicle, the detected illuminance of the second illuminance sensor 12 quickly decreases.

At the comparison determination of step S300, the general reference illuminance $\alpha_0$ is used as the light threshold when the exterior environment of the vehicle does not change. In contrast, when the tunnel is detected by the second illuminance sensor 12, the tunnel reference illuminance $\alpha_1$ higher than the general reference illuminance $\alpha_0$ is used as the light threshold $\alpha$. In this case, even when the illuminance I1 detected by the first illuminance sensor 11 is relatively high, the vehicle lights are turned on when the illuminance I1 detected by the first illuminance sensor 11 is equal to or lower than the tunnel reference illuminance $\alpha_1$ that is higher than the general reference illuminance $\alpha_0$.

Thus, in the light control device 100 of this embodiment, when the vehicle enters into the tunnel, the vehicle lights can be immediately turned on. FIG. 5 is a graph showing variations in the illuminance I1 detected by the first illuminance sensor 11 and the illuminance I2 detected by the second illuminance sensor 12 when the vehicle enters a tunnel having a bright inlet. As shown in FIG. 5, even when the inlet is bright in the tunnel, the illuminance I2 detected by the second illuminance sensor 12 is reduced quickly as compared with that of the first illuminance sensor 12, the tunnel detection effect can be effectively improved.

According to this embodiment of the present invention, because the tunnel is determined based on the illuminance I2 detected by the second illuminance sensor 12, an elevated bridge is not incorrectly determined as a tunnel. Therefore, it can prevent the vehicle lights are incorrectly turned on while the vehicle passes the elevated bridge.

The light control device 100 of this embodiment is provided with the rain sensor 13 for detecting a raining state. Further, in a rainfall time, the CPU 21 of the light ECU 20 compares the illuminance I1 detected by the first illuminance sensor 11 with the rain reference illuminance $\alpha_2$ that is set higher than the general reference illuminance $\alpha_0$, and controls the turning on and off of the vehicle lights. Thus, even when the illuminance detected by the first illuminance sensor 11 is relatively high, the vehicle lights are turned on when the illuminance I1 detected by the first illuminance sensor 11 is equal to or lower than the rain reference illuminance $\alpha_2$. Accordingly, the vehicle lights can be suitably turned on or off in accordance with a raining state or non-raining state.

Generally, the visibility of a driver deteriorates by rain in the raining state. In this embodiment, even when the illuminance I1 detected by the first illuminance sensor 11 in the raining state is in an illuminance range where the vehicle lights are not necessarily needed in the non-raining state, the vehicle lights are turned on early in the raining state so that the driver maintains a good visibility. Accordingly, the light control device 100 can suitably control the turning on or off operation of the vehicle lights in accordance with the external environment of the vehicle.

In the above-described embodiment, the light turning on operation is described in detail. However, the light turning off operation can be performed similarly to the light turning on operation. In this case, the light threshold $\alpha$ in the light turning off operation can be set to correspond to that in the light turning on operation, or can be set different from that in the light turning on operation.

Although the present invention has been fully described in connection with the preferred embodiments thereof with reference to the accompanying drawings, it is to be noted that various changes and modifications will become apparent to those skilled in the art.

For example, in the above-described embodiment, a tunnel is distinguished from an elevated bridge and the tunnel is detected by using the second illuminance sensor 12. However, when the tunnel can be detected, the other device or means can be used. For example, the first illuminance sensor 11 can be also used as the tunnel detecting means. In this case, a tunnel is detected based on a fluctuation of the illuminance I1 detected by the first illuminance sensor 11.

Figure 6:
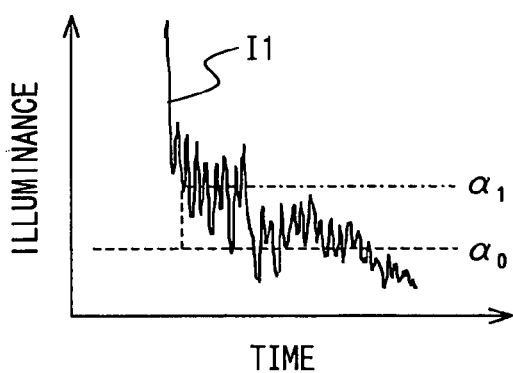
FIG. 6 is a graph for explaining a turning on or off control operation of vehicle lights according to a modification of the preferred embodiment.

Generally, lamps are arranged in a tunnel at a predetermined internal. Therefore, the illuminance I1 detected by the first illuminance sensor 11 fluctuates as shown in FIG. 6, for example. FIG. 6 is a graph showing variations of the illuminance I1 before and after the vehicle approaches the tunnel. As shown in FIG. 6, the fluctuation is different in accordance with a tunnel state of whether or not the lamps are provided. Accordingly, the tunnel can be determined based on the fluctuation of the illuminance I1. When a tunnel is detected based on the fluctuation of the illuminance I1 in FIG. 6, a tunnel reference illuminance $\alpha_1$ is used as the light threshold $\alpha$, instead of the general reference illuminance $\alpha_0$. Therefore, the vehicle lights can be quickly turned on when the vehicle enters the tunnel.

When the tunnel has a light inlet, the illuminance I1 detected by the first illuminance sensor 11 is gradually decreased while fluctuating as shown in FIG. 6. When a tunnel is detected by using the first illuminance sensor 11, an additional unit for detecting a tunnel is unnecessary, and the structure of the light control device 100 can be made simple.

The light ECU 20 can be operatively linked with a vehicle navigation system. In this case, a tunnel information can be obtained from the vehicle navigation system as the tunnel detecting means. Further, a camera device including a camera (e.g., CCD) can be used as the tunnel detecting means. For example, picture date at a vehicle front side is obtained from a camera attached to the vehicle, and it can be determined whether or not there is a tunnel based on the picture date. Furthermore, a device for detecting frequency of lamps can be also used as the tunnel detecting means.

In the above-described embodiment, the tunnel reference illuminance $\alpha_1$ and the rain reference illuminance $\alpha_2$ are set beforehand, and are stored in the EEPROM 23. However, only the general reference illuminance $\alpha_0$ can be stored in the EEPROM 23, and the tunnel reference illuminance $\alpha_1$ and the rain reference illuminance $\alpha_2$ can be calculated by the CPU 21 in a tunnel detection and a rain detection.

In the above-described embodiment, the vehicle lights are turned on or off after a predetermined time (delay time) passes from the comparison determination between the illuminance I1 detected by the first illuminance sensor 11 and the light threshold $\alpha$. However, the delay time can be set in accordance with exterior environment of the vehicle. In this case, the turning on and off control can be performed in detail.

Figure 7:
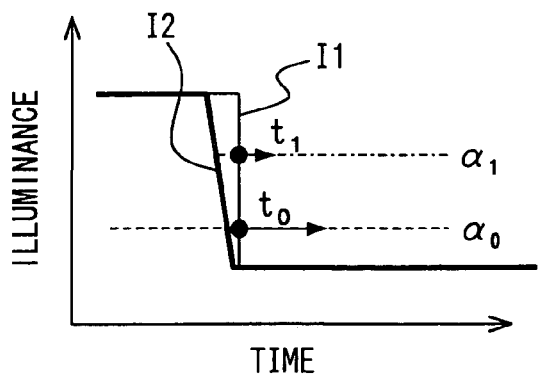
FIG. 7 is a graph for explaining a turning on or off control operation of vehicle lights according to another modification of the preferred embodiment.

For example, a tunnel delay time t1 shorter than a general predetermined delay time t0 can be set and stored in the EEPROM 23. Further, when it is determined that the illuminance I1 detected by the first illuminance sensor 11 is equal to or lower than the tunnel reference illuminance $\alpha_1$ as the light threshold $\alpha$, the vehicle lights can be turned on at a time delayed by the tunnel delay time t1 from this determination. Generally, when no lamp is provided inside the tunnel or when the lamp at the inlet of the tunnel has an illuminance different from that of lamp inside the tunnel, the illuminance detected by the first illuminance sensor 11 is not gradually changed as shown in FIG. 7. Even when the illuminance detected by the first illuminance sensor 11 is not gradually changed, because the tunnel delay time t1 is set shorter than the general delay time t0, the vehicle lights can be quickly turned on when the vehicle enters the tunnel.

In the above-described embodiment, the timer 25 can be omitted without setting the delay time only when the tunnel is accurately detected as the tunnel by using the second illuminance sensor 12. In this case, the structure of the light control device 100 can be made simple.

In the above-described embodiment, the rain sensor 13 is used as a precipitation detecting means for detecting a precipitation, and the rain reference illuminance $\alpha_2$ (precipitation detecting means) is used as the light threshold $\alpha$ based on a precipitation detection signal from the precipitation detecting means such as the rain sensor 13. However, the precipitation detecting means is not limited to this example. For example, when the wiper drive device is operated, the precipitation can be detected. Accordingly, when a wiper drive signal is received from the wiper drive device, the CPU 21 of the light ECU 20 can use the precipitation reference illuminance $\alpha_2$ (e.g., rain reference illuminance $\alpha_2$) as the light threshold $\alpha$.

Furthermore, the precipitation state detecting signal such as the raining state detection signal can be set at multiple steps in accordance with the precipitation state, and the precipitation reference illuminance can be set at multiple steps in accordance with the multiple-steps precipitation state detection signals. Even when the illuminance I1 detected by the first illuminance sensor 11 is the same, the visibility of the driver changes based on the precipitation such as the raining state. The amount of precipitation can be calculated from a variation amount of the infrared ray receiving amount, and the precipitation state detection signals can be set at the multiple steps.

Generally, the wiper drive state is adjusted at multiple state (e.g., Low, Intermediate, High) corresponding to the precipitation, based on a switch signal of a passenger or a signal from the precipitation detecting means such as the rain sensor 13. Accordingly, when the precipitation reference illuminance $\alpha_2$ is set at multiple steps in accordance with a precipitation amount detected by the precipitation detecting sensor such as the rain sensor 13 or the wiper drive signal, the vehicle lights can be suitably turned on or off in accordance with precipitation state. As a result, the driver can maintain good visibility.

Furthermore, when the light ECU 20 receives a tunnel detection signal from the tunnel detecting means while receiving the precipitation state detection signal from the precipitation detecting means, the light ECU 20 performs the turning on or off control by comparing the illuminance I1 detected by the first illuminance sensor 11 with the tunnel reference illuminance $\alpha_1$, regardless of the precipitation state detection signal such as the raining state detecting signal. In contrast, when the light ECU 20 receives the precipitation state detection signal from the precipitation state detecting means without receiving the tunnel detection signal, the light ECU 20 performs the turning on or off control by comparing the illuminance I1 detected by the first illuminance sensor 11 with the precipitation reference illuminance $\alpha_2$.

Such changes and modifications are to be understood as being within the scope of the present invention as defined by the appended claims.

What is claimed is:

1. A light control device for a vehicle, comprising:
   an upper side illuminance sensor for detecting an illuminance at an upper side of the vehicle;
   a control portion which determines whether the illuminance detected by the upper side illuminance sensor reaches a preset first reference illuminance, and performs a turning on or off control of a light of the vehicle based on a determined result; and
   an environment change detecting means for detecting a predetermined external environment change of the vehicle, the environment change detecting means connected to the control portion to send an external environment change signal to the control portion when the environment change detecting means detects the predetermined external environment change, wherein
   when the control portion receives the external environment change signal from the environment change detecting means, the control portion uses a second reference illuminance higher than the first reference illuminance, instead of the first reference illuminance, and performs the turning on or off control by comparing the illuminance detected by the upper side illuminance sensor with the second reference illuminance,
   the environment condition detecting means includes a tunnel detecting means for detecting a tunnel, and
   when the control portion receives a tunnel detection signal from the tunnel detecting means, the control portion performs the turning on or off control by comparing the illuminance detected by the upper side illuminance sensor with a tunnel reference illuminance used as the second reference illuminance.

2. The light control device according to claim 1, further comprising
   a front side illuminance sensor for detecting an illuminance at a front side of the vehicle, wherein the tunnel detecting means detects a tunnel using the illuminance detected by the front side illuminance sensor.

3. The light control device according to claim 1, wherein:
the tunnel detecting means detects a tunnel based on fluctuation of the illuminance detected by the upper side illuminance sensor.

4. The light control device according to claim 1, wherein the second reference illuminance is set to be changed in accordance with the external environment change signal.

5. A light control device for a vehicle, comprising:
an upper side illuminance sensor for detecting an illuminance at an upper side of the vehicle;
a control portion which determines whether the illuminance detected by the upper side illuminance sensor reaches a preset first reference illuminance, and performs a turning on or off control of a light of the vehicle based on a determined result; and
an environment change detecting means for detecting a predetermined external environment change of the vehicle, the environment change detecting means connected to the control portion to send an external environment change signal to the control portion when the environment change detecting means detects the predetermined external environment change, wherein
when the control portion receives the external environment change signal from the environment change detecting means, the control portion uses a second reference illuminance higher than the first reference illuminance, instead of the first reference illuminance, and performs the turning on or off control by comparing the illuminance detected by the upper side illuminance sensor with the second reference illuminance,
the environment change detecting means includes a precipitation detecting means for detecting precipitation, and
when the control portion receives a precipitation detection signal from the precipitation detecting means, the control portion performs the turning on or off control by comparing the illuminance detected by the upper side illuminance sensor with a precipitation reference illuminance used as the second reference illuminance.

6. The light control device according to claim 5, wherein the precipitation detecting means is a rain sensor for detecting rain drops on a windshield of the vehicle.

7. The light control device according to claim 5, wherein the precipitation detecting means detects the precipitation based on a drive operation of a wiper drive device of the vehicle.

8. The light control device according to claim 5, wherein:
the precipitation detecting means outputs the precipitation detection signal in multiple steps in accordance with the precipitation; and
the precipitation reference illuminance is set in multiple steps in accordance with the precipitation detection signal.

9. The light control device according to claim 5, wherein:
the environment condition detecting means further includes a tunnel detecting means for detecting a tunnel; and
the tunnel detecting means detects a tunnel based on fluctuation of illuminance detected by the first illuminance sensor;
when the control portion receives a tunnel detection signal from the tunnel detecting means, the control portion performs the turning on or off control by comparing the illuminance detected by the upper side illuminance sensor with a tunnel reference illuminance used as the second reference illuminance, regardless of the precipitation detecting signal; and
when the control portion receives the precipitation detection signal from the precipitation detecting means without receiving the tunnel detection signal, the control portion performs the turning on or off control by comparing the illuminance detected by the upper side illuminance sensor with the precipitation reference illuminance.

10. The light control device according to claim 5, further comprising
a front side illuminance sensor for detecting an illuminance at a front side of the vehicle, wherein:
the environment condition detecting means further includes a tunnel detecting means for detecting a tunnel; and
the tunnel detecting means detects the tunnel based on the illuminance detected by the front side illuminance sensor;
when the control portion receives a tunnel detection signal from the tunnel detecting means, the control portion performs the turning on or off control by comparing the illuminance detected by the upper side illuminance sensor with a tunnel reference illuminance used as the second reference illuminance, regardless of the precipitation detection signal; and
when the control portion receives the precipitation detection signal from the precipitation detecting means without receiving the tunnel detection signal, the control portion performs the turning on or off control by comparing the illuminance detected by the upper side illuminance sensor with the precipitation reference illuminance.

11. A light control device for a vehicle, comprising:
an upper side illuminance sensor for detecting an illuminance at an upper side of the vehicle;
a control portion which determines whether the illuminance detected by the upper side illuminance sensor reaches a preset first reference illuminance, and performs a turning on or off control of a light of the vehicle based on a determined result; and
an environment change detecting means for detecting a predetermined external environment change of the vehicle, the environment change detecting means connected to the control portion to send an external environment change signal to the control portion when the environment change detecting means detects the predetermined external environment change, wherein
when the control portion receives the external environment change signal from the environment change detecting means, the control portion uses a second reference illuminance higher than the first reference illuminance, instead of the first reference illuminance, and performs the turning on or off control by comparing the illuminance detected by the upper side illuminance sensor with the second reference illuminance,
the control portion performs the turning on or off control of the light at a time delayed by a predetermined time after the control portion determines that the illuminance detected by the upper side illuminance sensor reaches the first reference illuminance,
the environment condition detecting means includes a tunnel detecting means for detecting a tunnel, and
when the control portion receives a tunnel detection signal from the tunnel detecting means, the control portion performs the turning on or off control of the light at a time delayed by a delay time shorter than the predetermined time after the control portion determines that the illuminance detected by the upper side illuminance sensor reaches the second reference illuminance.

12. The light control device according to claim 11, further comprising
a front side illuminance sensor for detecting an illuminance at a front side of the vehicle, wherein the tunnel detecting means detects a tunnel using the illuminance detected by the front side illuminance sensor.

13. The light control device according to claim 11, wherein:
the tunnel detecting means detects a tunnel based on fluctuation of the illuminance detected by the upper side illuminance sensor.

14. A light control device for a vehicle, comprising:
an upper side illuminance sensor for detecting an illuminance at an upper side of the vehicle;
a control portion which determines whether the illuminance detected by the upper side illuminance sensor is equal to or lower than a predetermined reference illuminance, and performs a turning on or off control of a light of the vehicle based on a determined result at a time delayed by a predetermined time from the determination;
a tunnel detecting means for detecting a tunnel, wherein when the control portion receives a tunnel detection signal from the tunnel detecting means, the control portion performs the turning on or off control of the light at a time delayed by a delay time shorter than the predetermined time, from the determination; and
a front side illuminance sensor for detecting an illuminance at a front side of the vehicle, wherein the tunnel detecting means detects a tunnel using the illuminance detected by the front side illuminance sensor.

15. A light control device for a vehicle, comprising:
an upper side illuminance sensor for detecting an illuminance at an upper side of the vehicle;
a control portion which determines whether the illuminance detected by the upper side illuminance sensor is equal to or lower than a predetermined reference illuminance, and performs a turning on or off control of a light of the vehicle based on a determined result at a time delayed by a predetermined time from the determination; and
a tunnel detecting means for detecting a tunnel; and
when the control portion receives a tunnel detection signal from the tunnel detecting means, the control portion performs the turning on or off control of the light at a time delayed by a delay time shorter than the predetermined time, from the determination, wherein:
the tunnel detecting means detects a tunnel based on fluctuation of the illuminance detected by the first illuminance sensor.

16. A light control device for a vehicle, comprising:
an upper side illuminance sensor for detecting an illuminance at an upper side of the vehicle;
a control portion which determines whether the illuminance detected by the upper side illuminance sensor is equal to or lower than a predetermined reference illuminance, and performs a turning on or off control of a light of the vehicle based on a determined result at a time delayed by a predetermined time from the determination;
a tunnel detecting means for detecting a tunnel; and
when the control portion receives a tunnel detection signal from the tunnel detecting means, the control portion performs the turning on or off control of the light at a time delayed by a delay time shorter than the predetermined time, from the determination, wherein:
when the control portion receives the tunnel detection signal from the tunnel detecting means, the control portion uses a tunnel reference illuminance higher than the predetermined reference illuminance, instead of the predetermined reference illuminance, and performs the turning on or off control at a time delayed by the delay time after determining whether the illuminance detected by the upper side illuminance sensor reaches the tunnel reference illuminance.

* * * * *